Nov. 23, 1926.

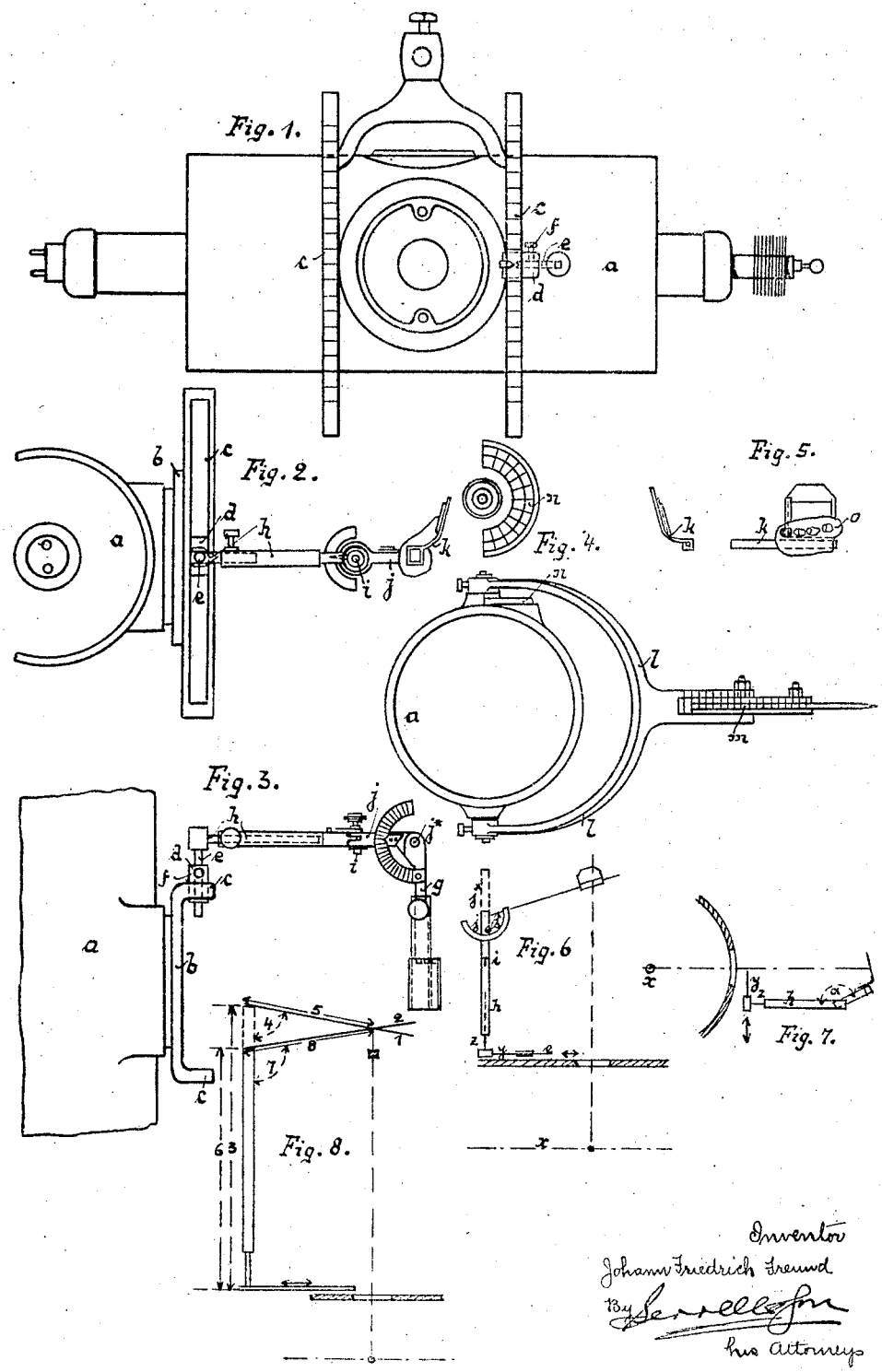

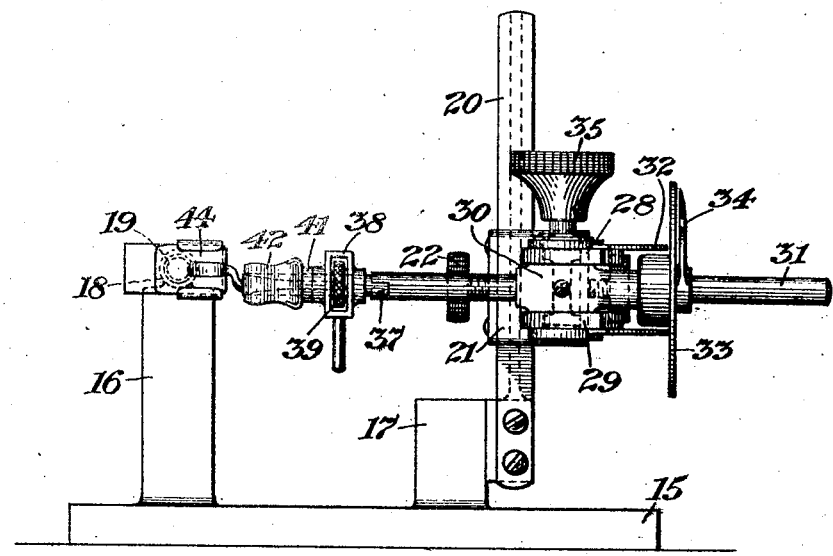
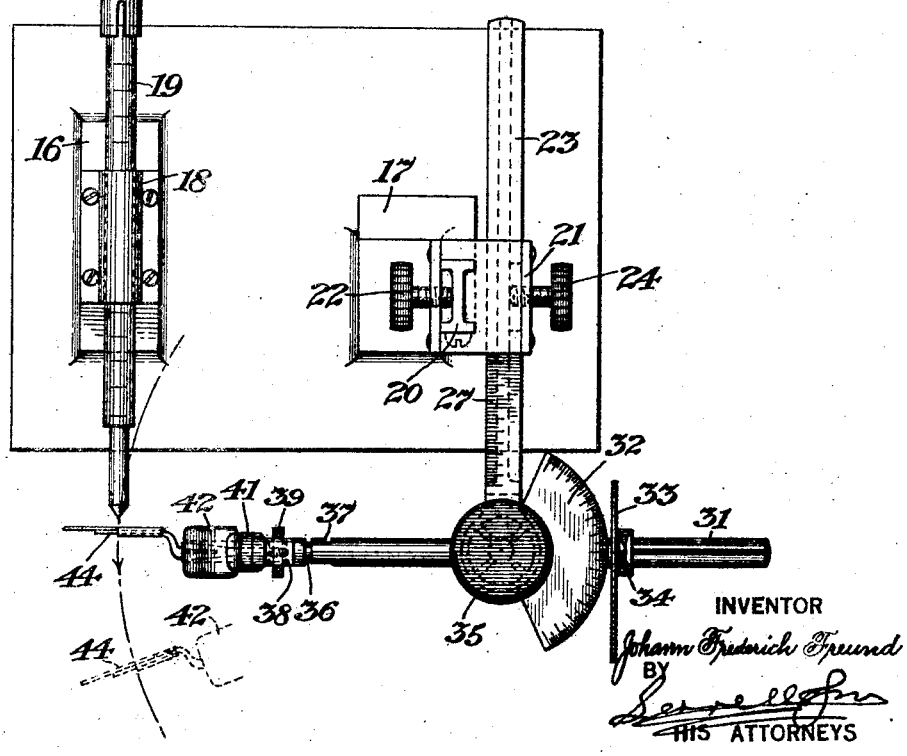

J. F. FREUND 1,608,269

X-RAY APPARATUS

Filed Oct. 24, 1922

INVENTOR

Johann Friederich Freund

BY

HIS ATTORNEYS

Patented Nov. 23, 1926.

1,608,269

UNITED STATES PATENT OFFICE.

JOHANN FRIEDRICH FREUND, OF DRESDEN, GERMANY.

X-RAY APPARATUS.

Application filed October 24, 1922. Serial No. 596,697, and in Germany November 19, 1921.

In the use of X-ray apparatus as now constructed it is not possible to obtain an exact shadowgraph of an object especially for dental purposes. This is due to the fact that in consequence of the different anatomic and histological structure of the upper and lower jaw and the teeth a just and true shadowgraph could not be obtained at the original exposure, and therefore it has been necessary by further exposures, to eliminate previous errors. Consequently, it has been impossible to tell at what assumed distance the original exposure was taken and therefore further adjustments could not be made by use of the first exposure in regard to a fine adjustment and consequently exact, sharp, and true shadowgraphs could not be obtained. Because of this all X-ray pictures thus far obtained for dental purposes are more or less imperfect. Furthermore, it has been impossible by the first exposure to obtain shadowgraphs of a given object free from errors, since the position of the angle of the film in the mouth in respect to the directions which the X-rays had to take from the focus of the X-ray tube, could not be determined, nor could any other fixed point be established by which the adjustment as to the angular position of the focus of the tube could be made free of errors, and by which shadowgraphs of given objects could be obtained free of distortion.

These disadvantages are eliminated by the apparatus comprising the present invention and it is now possible to obtain a flawless shadowgraph of the object even at the first exposure, and to make additional exposures under exactly the same angular conditions as the first one taken at a certain angle in regard to the original exposure, or to furthermore adjust them for a proper angulation making it possible to use the original exposure as a guide for further exposures.

In making the original exposure the film or plate-carrier is fixed in a predetermined position by the use of a holder which permits an adjustment in all directions within a certain space. By the aid of an impression-composition, such as plaster of Paris or modeling compound, etc., an impression is made in regard to the object to be taken and this predetermined position with its resulting dimensions—that is the distances between the film or plate—carrier or the focus of the X-ray tube and the object to be taken towards its angulation to the plate or film—as well as the angulation of the object towards the plate is determined and as thus ascertainment is used in determining the direction and fixation of the central-ray. In the first exposure the film is brought into a desired position to the focus of the X-ray tube and with this established position the mutual adjustment of the holder and film is determined for any desired adjustment of the film and the plate-carrier. For any desired adjustment of the film or plate-carrier that part of the holder which is attached to the X-ray tube-holder is moved parallel to the axis of the X-ray tube and then perpendicularly adjusted. The film-carrier is moved to a desired distance from the focus of the tube and the hinged parts of the holder are adjusted in a vertical and horizontal plane at a certain angle at which now the original exposures are obtained.

With this adjustment the object to be taken will be brought exactly into the central-ray of the focus of the X-rays and also the exact distance of the former from the focus to the film-carrier in the mouth is fixed and by this adjustment the original exposure is obtained. In the original exposure the film-carrier, for example in taking shadowgraphs for dental purposes, is fixed in the mouth of the patient by a bite-plate or an impression; for all exposures this impression is again employed and thus the same condition is established by the impression in the mouth for further exposures.

If it is intended to obtain, according to the above described process, not only simple but also stereoscopic pictures, they may be taken by this arrangement. Varying from the usual manner of making stereoscopic exposures in which the Roentgen-tube was moved in relation to the distance of the human eyes, while the film remains stationary in the same position, the process according to the present invention is modified to the effect that the tube remains stationary, while the film in the mouth as well as the object to be taken is moved and adjusted to different angulations. By this procedure the advantage is obtained that the Roentgen-tube remains stationary and the film-carrier is adjusted within its adjustable holder and into a predetermined position.

The device for carrying out the process for taking X-ray pictures for medical, and more especially dental purposes according to the present invention is represented in the drawing in the form of a more or less diagrammatic construction.

In the drawing:

Fig. 1 is a front view of the Roentgen-tube.

Fig. 2 is a side view.

Fig. 3 is a plan of the same.

Fig. 4 shows a detail of the construction.

Fig. 5 is a front and side elevation of a film carrier.

Figs. 6, 7 and 8 are diagrammatic views illustrating parts of the apparatus for the purpose of explaining its use.

Fig. 9 is a front elevation of an apparatus illustrating another form of my invention.

Fig. 10 is a plan of the same.

Figure 11:
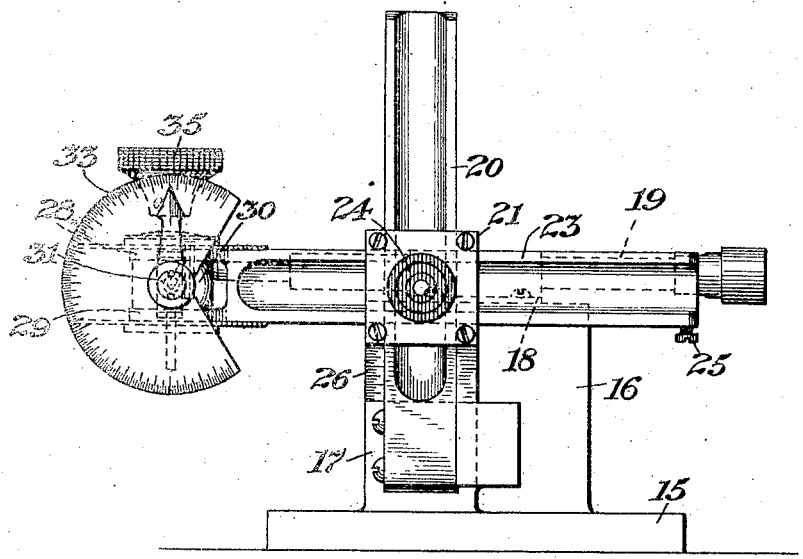
Fig. 11 is a side elevation of the apparatus shown in Fig. 9.

As clearly seen from Figs. 1, 2 and 3, a ring-shaped casing $b$ is arranged on the holder $a$ of the Roentgen-tube and carries at its left and right-hand sides two guides $c$. A slide $d$ is vertically movable in said guides and is provided with a transverse pin $e$ which can be adjustably guided by a screw $f$ so that the said pin $e$ is, by moving it in the slide $d$, adjusted parallel to the axis of the Roentgen-tube and, by moving the slide $d$ within its guide $c$, at a right angle to the direction of the first mentioned adjustment.

The guides represented in the drawing are arranged as rectilinear ones, however they may be made in any shape to carry out the intended purposes of the invention.

A bar $h$ projecting at a right angle is fastened to the transverse pin $e$ guided in the slide $d$ and consists of two parts slidably mounted and adjustable to position one within the other. Said bar $h$ may also be arranged so as to be adjusted and fixed to the transverse bar $e$. The free end of the bar $h$ carries one leg of a bent-lever $j$ which is secured thereto by a hinge-bolt $i$, so as to be turned and adjusted. Both legs of this lever may be turned and adjusted around a bolt $j^*$ arranged at a right angle to the bolt $i$. The free end of this bent lever carries the film-carrier $k$ which may be moved along the same and fixed in such a manner that said carrier is adjustable in all directions by the mutual adjustment of the separate parts and may thus be brought into the position suitable for taking a picture.

Without departing from the scope of the present invention, the hinge-bolts $i$ and the bolts $j$ may be combined in a known manner as a hinge member.

By forming the carrier in the manner hereinbefore described above it will be possible to adjust, in relation to the focus of the Roentgen-tube, the film-carrier $k$ in any desired position and in such a manner that the object to be taken is situated within the central ray of the Roentgen-tube or can be adjusted at any suitable angle in relation to the central ray. Furthermore it will be possible, for further exposures, with the aid of an originally taken picture, to bring the object into precisely the same position as it had in the original exposure.

For the adjustment of the film-carrier $k$ in relation to the focus of the Roentgen-tube the transverse pin $e$ is first adjusted and fixed in the slide $d$ which is hereafter fixed, whereupon by elongating or shortening the bar $h$, the film-carrier is brought to the desired distance from the focus of the Roentgen-tube. Then, by adjusting the legs of the bent-lever, that is, by turning the latter around the hinge-bolt $i$ at the angle $\alpha$, the film-carrier is adjusted in the vertical plane and, by turning one to another both legs around the bolt $j^*$ at the angle $\beta$, said film-carrier is adjusted and fixed in the horizontal plane. The film rests flatly on the plate of its carrier.

The separate parts of the holder adjustable one to another are provided with graduations or scales and the bolts of the parts are fitted with circular graduations or scales which permit the mutual position of the parts to be read.

To enable the adjustment of the object to be taken within the central ray of the focus of the Roentgen-tube at the desired distance from the focus of said tube a bow of the length of a quarter or half circle is so arranged that it can be turned and fixed on the Roentgen-tube holder $a$ or on the casing $b$ in such a manner that it may be brought exactly into the vertical central position or moved by it to the right or lefthand. A bar $m$ consisting of several parts capable of being moved along one another and provided with graduations is centrally fastened to the bow $l$. Another graduation $n$ is provided on the upper surface of the holder $a$ on which each position of the bow can be read.

If the bow $l$ is precisely situated within the central vertical plane and the object coincides with the end of the central bar $m$, the object to be taken is precisely situated within the central ray of the focus of the Roentgen-apparatus and the distance between the object and the focus as well as the mutual position and the angles between the separate parts of the holder may be read off the separate graduations provided on the holder.

The measuring-apparatus described can also be used in taking a distinct surface, for determining the size of the diaphragm or shutter corresponding to the distance between the object and the focus of the tube; for this purpose it is necessary only to read each position of the bow on the upper graduation and to correspondingly select and adjust the diaphragm or shutter.

The process described for taking shadowgraphs is carried out for instance for dental purposes as follows:

An impression or other suitable substance as for instance plaster of Paris or the like rendered soft by heating is applied on the film carrier $k$ shewn in Fig. 5, and this carrier covered with said substance is inserted into the mouth of the patient who then closes the jaws so that the impression substance or bite plate $o$ and the film carrier $k$ are fixed in a definite position by the pressure of the upper or lower teeth in the impression substance or, in case of lack of teeth, by pressing the parts of the gum, mucous membranes or the like into the impression-substance. After the setting of the impression-substance the impression obtained together with its carrier serves for making further exposures in the same position and a corresponding insertion of the film-carrier into the mouth of the patient to always ensure the same position as that which is obtained in making the impression.

If the impression is obtained in the manner described, the film-carrier $k$ carrying the impression-substance $o$ is put and fastened on the free leg of the bent-lever $j$. Now by adjusting the separate parts of the carrier in the manner described the film inserted at the rear of a guide-ledge of the plate of the film-carrier $k$ can be brought exactly into the central ray of the focus of the Roentgen-tube. Simultaneously the direction and the distance between the object and the focus can definitely be established and read on the separate scales. The dimensions read off the separate scales and marked during the original taking-procedure make it possible to adjust the apparatus for making further exposures in quite the same manner as originally done. Later exposures under an angle different from that stated by the adjustments done during the original taking procedure can be obtained by an alteration of the vertical or horizontal angle.

If the separate parts of the apparatus are brought so to speak into the zero-position in other words if the transverse bar $e$ carrying the film-carrier is situated precisely parallel to the longitudinal axis of the Roentgen-tube and in a common plane with the central ray, the film-carrier plate receiving the film is situated towards the central ray under the same angle as the plate towards the bent-lever leg.

A relatively great number of film-carriers is kept in stock for the various wants of anatomic varieties; in said carriers the plate for supporting the film is situated at an angle (0 to 90 degrees) towards the bent-lever leg carrying said plate.

Figs. 6 and 7 show diagrammatically the carrier and the adjustment of its parts one to another as well as the angle position in the vertical or horizontal plane. As seen from said figures $x$ is the longitudinal axis of the Roentgen-tube, $e$ the transverse-bar, and $y$ the part of the latter capable of being adjusted in the direction represented by arrow and parallel to the longitudinal axis of the tube as well as at right angle to said direction of adjustment. $h$ is the bar and $z$ the part of the latter variable in length and to which the bent-lever leg $j$ is hinged on the horizontally arranged bolt $i$ and arranged to be fixed. As clearly seen from Fig. 7, the leg mentioned can be adjusted according to the vertical angle $\alpha$. Furthermore both legs can be turned on the vertical bolt $j^*$ so that the film or plate-carrier can be adjusted also according to the horizontal angle $\beta$.

In taking stereoscopic pictures, the operation may be explained with the aid of Fig. 8. For such operation two exposures have to be made: one in the position 1, and another in the position 2. In bringing the film or plate-carrier into the central ray, the length 3 and the angle 4 belonging to it and the distance 5, for the first exposure, are obtained by calculation. Then for the second exposure the distance 6, the angle 7 and the distance 8 are stated. Besides these statements the two horizontal angles must be fixed one of which is represented in Fig. 7.

The carrier is then adjusted in the manner described above and on the basis of the values found.

The apparatus described is supported by the Roentgen-device itself so that the handling of the separate parts of said apparatus for setting the parts for the original and all further exposures is relatively a complicated and difficult one.

To obviate this drawback, an accessory apparatus fully independent from the Roentgen-apparatus may be arranged. Fig. 9 shows a perspective view of said apparatus and Fig. 10 represents a detail of the latter.

Figure 12:
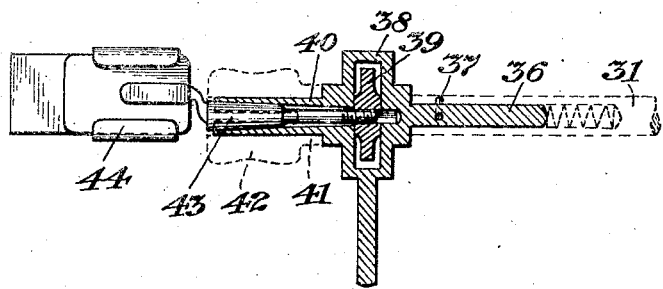
Fig. 12 is an enlarged longitudinal section showing the construction of the bite plate, film holder, and parts in which they are mounted.

In the form of the invention shown in Figs. 9 to 12 inclusive, the structure may be mounted on a base 15 on which there is supported suitable blocks 16, 17. At the upper end of the block 17 there is a sleeve 18 in which there is slidably mounted a stem 19. This stem 19 is adjustable to position longitudinally in the sleeve 18 and is intended to represent the longitudinal axis of the central ray of light of a Roentgen tube employed with the apparatus in taking X-ray pictures.

Suitably attached to the block 17 is a standard or guide 20. Mounted on this guide is a slide 21. This slide 21 is movable in a direction parallel to a vertical plane passing through the axis of the stem 19 and may be secured in any desired position by means of a set screw 22. Passing through the slide 21 in a direction at right angles to the guide 20 is a bar 23. This is adjustable to position also in a line substantially parallel to a vertical plane parallel to the axis of the stem 19 and the bar 23 may be fixed in any adjustable position by means of a set screw 24. The bar at one end may be fitted with a stop screw 25. As indicated, one face of the guide 20 may be provided with a scale 26 so as to make it possible for the operator to re-set the slide 21 in precisely the same position in which it may have been set before. One edge preferably the upper edge or face of the bar 23 is also provided with a scale which is indicated at 27 so that by using a face of the slide 21 this scale 27 may be employed to enable the operator to set the bar 23 in precisely the same position in which it may have been set before.

The end of the bar 23 opposite to that to which the stop screw 25 is secured is preferably bifurcated as indicated at 28 and 29. These bifurcated ends of the bar are preferably horizontal and between them there is mounted a sleeve 30. Passing through and journaled in this sleeve 30 there is a rod 31. On the end of the bar 23 there is a scale 32 and on the adjacent end of the sleeve 30 there is a scale 33. Also secured in the rod 31 there is an index or pointer 34 adapted to cooperate with the scale 33 so as to enable the operator to set the rod to the same angular position in which it may have been set before. The rod and the sleeve within which it is mounted swing between the bifurcated ends of the bar 23 and may be fixed in any desired position by means of a set screw 35. The edge of the scale 33 cooperating with the scale 32 enables the operator to set the rod and its sleeve in any revoluble position in which it may have been placed before.

The end of the rod 31 is provided with a bore for the reception of an auxiliary rod 36 which may be mounted therein by a bayonet joint 37 or otherwise and is normally pressed outwardly by a suitable spring placed in the base of the bore and connecting with the inner end of the auxiliary rod. This auxiliary rod 36 is fitted with a frame 38 in which there is a thumb screw 39 and also with a bearing 40 adapted to receive a bite plate 41 having mounted thereon a suitable plastic composition 42 in which an impression may be readily made upon being gripped by the teeth. The bearing 40 is preferably provided with a bore adapted to receive a pin 43 at the outer end of which a film holder 44 is mounted, the film holder and the pin 43 being revoluble within the bearing 40 and secured in position by the screw threaded inner end of the pin being engaged by the thumb screw 39.

It will now be readily understood that the film holder may be shifted to positions parallel to the rays of the Roentgen tube by adjusting the position of the bar 23. These parts may also be shifted at right angles to the axis of the rays of the Roentgen tube by adjusting the elevation of the slide 21. Furthermore, these parts, that is the film holder and the bite plate may be shifted to angular positions relatively to a plane parallel to the rays of the Roentgen tube by shifting the rod 31 and the scale 32 to any one of their adjustable positions and then the film holder and bite plate may be shifted to angular positions relatively to a plane at right angles to the axis of the Roentgen tube by turning the bite plate and the pin 43 and then locking the same in their adjusted positions. It will also be understood that the bite plate is revolubly adjustable on the bearing on which it is mounted and that this and the film holder are secured together and in position by being clamped in turning up the thumb screw 39.

What I claim is:

1. In an apparatus for taking X-ray pictures, a Roentgen tube, a film holder, a bite plate, and means for adjusting the bite plate and film holder relatively to one another and for shifting the bite plate and film holder to position parallel to the rays of the Roentgen tube.

2. In an apparatus for taking X-ray pictures, a Roentgen tube, a film holder, a bite plate, and means for adjusting the bite plate relatively to the film holder and for simultaneously shifting the bite plate and film holder in a direction at right angles to the rays from the Roentgen tube.

3. In an apparatus for taking X-ray pictures, a Roentgen tube, a film holder, a bite plate, means for adjusting the bite plate and film holder relatively to one another and for shifting the bite plate and film holder to position parallel to the rays of the Roentgen tube, and means for shifting the bite plate and film holder in a direction at right angles to the rays from the Roentgen tube.

4. In an apparatus for taking X-ray pictures, a Roentgen tube, a film holder, a bite plate, means for adjusting the bite plate and film holder relatively to one another and for shifting the bite plate and film holder to position parallel to the rays of the Roentgen tube, and means for resetting and maintaining the said bite plate and film holder in any position to which the said parts are adjustable.

5. In an apparatus for taking X-ray pictures, a Roentgen tube, a film holder, a bite plate, means for adjusting the bite plate relatively to the film holder and for simultaneously shifting the bite plate and film holder in a direction at right angles to the rays from the Roentgen tube, and means for resetting and maintaining the said bite plate and film holder in any position to which the said parts are adjustable.

6. In an apparatus for taking X-ray pictures, a Roentgen tube, a film holder, a bite plate, means for adjusting the bite plate and film holder relatively to one another and for shifting the bite plate and film holder to position parallel to the rays of the Roentgen tube, means for shifting the bite plate and film holder in a direction at right angles to the rays from the Roentgen tube, and means for resetting and maintaining the said bite plate and film holder in any position to which the said parts are adjustable.

7. In an apparatus for taking X-ray pictures, a Roentgen tube, a film holder, a bite plate, and means for shifting the said bite plate and film holder to angular positions relatively to a plane parallel to the rays of the Roentgen tube.

8. In an apparatus for taking X-ray pictures, a Roentgen tube, a film holder, a bite plate, and means for shifting the said bite plate and film holder to angular positions relatively to a plane at right angles to the rays of the Roentgen tube.

9. In an apparatus for taking X-ray pictures, a Roentgen tube, a film holder, a bite plate, means for shifting the said bite plate and film holder to angular positions relatively to a plane parallel to the rays of the Roentgen tube, and means for shifting the said bite plate and film holder to angular positions relatively to a plane at right angles to the rays of the Roentgen tube.

10. In an apparatus for taking X-ray pictures, a frame, a Roentgen tube, a guide mounted in the frame, a slide movable in the said guide, a bar shiftable in the said slide, a rod adjustable to position in the said bar, and a film holder and bite plate adjustable relatively to one another and mounted on the said rod.

11. In an apparatus for taking X-ray pictures, a frame, means associated with the frame for supporting a Roentgen tube, a guide carried by the frame, a slide mounted on the guide, means for securing the slide in position on the guide, a bar shiftable in the said slide, means for securing the bar in position in the slide, a rod mounted in the said bar, means for securing the rod in position in the bar, a film holder, and a bite plate adjustable relatively to one another and connected to the said rod.

12. In an apparatus for taking X-ray pictures, a frame, means carried by the frame for supporting a Roentgen tube, a guide, a slide movable on the guide, means for securing the slide in position on the guide, a bar shiftable in the said slide, means for securing the bar in position in the slide, a rod adjustable longitudinally and revolubly in the said bar, means for securing the rod in position in the bar, and a film holder and bite plate adjustably connected to each other and mounted on the said bar.

13. In an apparatus for taking X-ray pictures, a frame, means carried by the frame for supporting a Roentgen tube, a guide, a slide movable on the guide, means for securing the slide in position on the guide, a bar shiftable in the said slide, means for securing the bar in position in the slide, a rod adjustable longitudinally and revolubly in the said bar, means for securing the rod in position in the bar, a film holder and bite plate adjustable relatively to one another, and means for removably connecting the said film holder and bite plate to the said rod.

14. In an apparatus for taking X-ray pictures, a frame, means carried by the frame for supporting a Roentgen tube, a guide mounted in the frame, a slide adjustable to position longitudinally of the guide, means for securing the slide in position on the guide, a bar movable in the said slide at right angles to the said guide, means for securing the bar in position in the said slide, a head pivotally mounted in the said bar, a rod adjustable longitudinally and revolubly in the said head, means for securing the bar in position in the said head, and a film holder and bite plate adjustable relatively to one another and connected to the said bar.

15. In an apparatus for taking X-ray pictures, a frame, means carried by the frame for supporting a Roentgen tube, a guide mounted in the frame, a slide adjustable to position longitudinally of the guide, means for securing the slide in position on the guide, a bar movable in the said slide at right angles to the said guide, means for securing the bar in position in the said slide, a head pivotally mounted in the said bar, a rod adjustable longitudinally and revolubly in the said head, a film holder and bite plate adjustably connected to one another, and means for removably mounting the said film holder and bite plate in the said rod.

16. In an apparatus for taking X-ray pictures, a frame, means carried by the frame for supporting a Roentgen tube, a guide mounted in the frame, a slide adjustable to position longitudinally of the guide, means for securing the slide in position on the guide, a bar movable in the said slide at right angles to the said guide, means for securing the bar in position in the said slide, a head pivotally mounted in the said bar, a rod adjustable longitudinally and revolubly in the said head, means for securing the bar in position in the said head, a film holder and bite plate adjustable relatively to one another and connected to the said bar, and a scale for setting the said rod and the film holder and bite plate carried thereby in any one of the revoluble positions of the said rod.

17. In an apparatus for taking X-ray pictures, a frame, means carried by the frame for supporting a Roentgen tube, a guide mounted in the frame, a slide adjustable to position longitudinally of the guide, means for securing the slide in position on the guide, a bar movable in the said slide at right angles to the said guide, means for securing the bar in position in the said slide, a head pivotally mounted in the said bar, a rod adjustable longitudinally and revoluble in the said head, means for securing the bar in position in the said head, a film holder and bite plate adjustable relatively to one another and connected to the said bar, and a scale for determining the revoluble position of the head pivotally mounted in the said bar and consequently the angular position of the said film holder and bite plate relatively to a plane parallel to the rays from the Roentgen tube.

18. In an apparatus for taking X-ray pictures, a frame, means carried by the frame for supporting a Roentgen tube, a band in which the frame is revoluble, means for securing the frame in position in the band, a guide mounted in the frame, a slide movable in the said guide, a bar shiftable in the said slide, a rod adjustable to position in the said bar, and a film holder and bite plate adjustable relatively to one another and mounted on the said rod.

19. In an apparatus for taking X-ray pictures, a frame, means carried by the frame for supporting a Roentgen tube, a band in which the frame is revoluble, means for securing the frame in position in the band, a guide carried by the frame, a slide mounted on the guide, means for securing the slide in position on the guide, a bar shiftable in the said slide, means for securing the bar in position in the slide, a rod mounted in the said bar, means for securing the rod in position in the bar, a film holder, and a bite plate adjustable relatively to one another and connected to the said rod.

20. In an apparatus for taking X-ray pictures, a frame, means carried by the frame for supporting a Roentgen tube, a band in which the frame is revoluble, means for securing the frame in position in the band, a guide, a slide movable on the guide, means for securing the slide in position on the guide, a bar shiftable in the said slide, means for securing the bar in position in the slide, a rod adjustable longitudinally and revolubly in the said bar, means for securing the rod in position in the bar, and a film holder and bite plate adjustably connected to each other and mounted on the said bar.

21. In an apparatus for taking X-ray pictures, a frame, means carried by the frame for supporting a Roentgen tube, a band in which the frame is revoluble, means for securing the frame in position in the band, a guide, a slide movable on the guide, means for securing the slide in position on the guide, a bar shiftable in the said slide, means for securing the bar in position in the slide, a rod adjustable longitudinally and revolubly in the said bar, means for securing the rod in position in the bar, a film holder and bite plate adjustable relatively to one another, and means for removably connecting the said film holder and bite plate to the said rod.

22. In an apparatus for taking X-ray pictures, a frame, means carried by the frame for supporting a Roentgen tube, a band in which the frame is revoluble, means for securing the frame in position in the band, a guide mounted in the frame, a slide adjustable to position longitudinally of the guide, means for securing the slide in position on the guide, a bar movable in the said slide at right angles to the said guide, means for securing the bar in position in the said slide, a head pivotally mounted in the said bar, a rod adjustable longitudinally and revolubly in the said head, means for securing the bar in position in the said head, and a film holder and bite plate adjustable relatively to one another and connected to the said bar.

23. In an apparatus for taking X-ray pictures, a frame, means carried by the frame for supporting a Roentgen tube, a band in which the frame is revoluble, means for securing the frame in position in the band, a guide mounted in the frame, a slide adjustable to position longitudinally of the guide, means for securing the slide in position on the guide, a bar movable in the said slide at right angles to the said guide, means for securing the bar in position in the said slide, a head pivotally mounted in the said bar, a rod adjustable longitudinally and revolubly in the said head, a film holder and bite plate adjustably connected to one another, and means for removably mounting the said film holder and bite plate in the said rod.

24. In an apparatus for taking X-ray pictures, a frame, means carried by the frame for supporting a Roentgen tube, a band in which the frame is revoluble, means for securing the frame in position in the band, a guide mounted in the frame, a slide adjustable to position longitudinally of the guide, means for securing the slide in position on the guide, a bar movable in the said slide at right angles to the said guide, means for securing the bar in position in the said slide, a head pivotally mounted in the said bar, a rod adjustable longitudinally and revolubly in the said head, means for securing the bar in position in the said head, a film holder and bite plate adjustable relatively to one another and connected to the said bar, and a scale for setting the said rod and the film holder and bite plate carried thereby in any one of the revoluble positions of the said rod.

25. In an apparatus for taking X-ray pictures, a frame, means carried by the frame for supporting a Roentgen tube, a band in which the frame is revoluble, means for securing the frame in position in the band, a guide mounted in the frame, a slide adjustable to position longitudinally of the guide, means for securing the slide in position on the guide, a bar movable in the said slide at right angles to the said guide, means for securing the bar in position in the said slide, a head pivotally mounted in the said bar, a rod adjustable longitudinally and revoluble in the said head, means for securing the bar in position in the said head, a film holder and bite plate adjustable relatively to one another and connected to the said bar, and a scale for determining the revoluble position of the head pivotally mounted in the said bar and consequently the angular position of the said film holder and bite plate relatively to a plane parallel to the rays from the Roentgen tube.

In testimony, that I claim the foregoing as my invention I have signed my name this 2nd day of October, 1922.

J. FRIEDRICH FREUND.